United States Patent
Krutsch et al.

(10) Patent No.: US 9,459,604 B2
(45) Date of Patent: Oct. 4, 2016

(54) METHODS AND SYSTEM FOR JOINING A SMART ENERGY DEVICE TO A ZIGBEE NETWORK

(71) Applicant: Digi International Inc., Minnetonka, MN (US)

(72) Inventors: Kenneth Frederick Krutsch, Minnetonka, MN (US); Jordan Focht, St Louis Park, MN (US)

(73) Assignee: Digi International Inc., Minnetonka, MN (US)

(*) Notice: Subject to any disclaimer, the term of this patent is extended or adjusted under 35 U.S.C. 154(b) by 517 days.

(21) Appl. No.: 13/969,886

(22) Filed: Aug. 19, 2013

(65) Prior Publication Data

US 2015/0051717 A1  Feb. 19, 2015

(51) Int. Cl.

| | | |
|---|---|---|
| G06F 15/16 | (2006.01) | |
| G05B 15/02 | (2006.01) | |
| H02J 3/14 | (2006.01) | |
| H04L 12/00 | (2006.01) | |
| H04L 12/64 | (2006.01) | |
| H04L 29/08 | (2006.01) | |

(52) U.S. Cl.
CPC ............... G05B 15/02 (2013.01); H02J 3/14 (2013.01); H04L 12/00 (2013.01); H04L 12/6418 (2013.01); H04L 67/125 (2013.01)

(58) Field of Classification Search
CPC ............................ H04L 67/125; H04L 12/283
USPC ................................................... 709/227, 228
See application file for complete search history.

(56) References Cited

U.S. PATENT DOCUMENTS

2004/0054569 A1*  3/2004  Pombo ............... G06Q 10/0633
                                                          705/7.27
2014/0229183 A1*  8/2014  Salisbury ................ G10L 15/22
                                                          704/275

* cited by examiner

*Primary Examiner* — Adnan Mirza
(74) *Attorney, Agent, or Firm* — Fogg & Powers LLC (57) ABSTRACT

One embodiment is directed to a method for joining a smart energy device to a ZigBee network. The method includes sending, from a ZigBee gateway to a database server, a first extended unique identifier (EUI) for the ZigBee gateway. The also method includes receiving a request from a first smart energy device to join the ZigBee gateway, the request including a second EUI corresponding to the first smart energy device. The second EUI from the first smart energy device is compared with the first one or more EUIs received from the database server. If the second EUI from the first smart energy device matches any of the first one or more EUIs, an install code or link key corresponding to the matched one of the first one or more EUIs is sent to the first smart energy device. Otherwise, an install code is requested from the user.

20 Claims, 4 Drawing Sheets

METHODS AND SYSTEM FOR JOINING A SMART ENERGY DEVICE TO A ZIGBEE NETWORK

BACKGROUND

Conventional means for joining a smart energy device to a ZigBee network include requiring a user to set up an account and provide identification information regarding the smart energy device to the ZigBee coordinator for the ZigBee network prior to allowing the smart energy device to join the network.

For example, one conventional method for joining a smart energy device requires a user to install an application on a computing device that is in a local area network with the ZigBee coordinator. The user is then required to set up a user account by inputting information into the application. The application identifies the ZigBee coordinator, a ZigBee gateway in this instance, in order to enable joining of the smart energy device to the ZigBee gateway. The application also prompts the user for identification information regarding the smart energy device to be joined. This identification information can include the extended unique identifier (EUI) for the smart energy device as well as an install code used to further verify the smart energy device. After obtaining this information, the application configures the ZigBee gateway to allow joining of a smart energy device matching the provided information. The user is prompted to power-up the smart energy device which causes the smart energy device to send an association request to the ZigBee gateway. If the information provided by the smart energy device matches the information provided by the application, the ZigBee gateway joins the smart energy device to the ZigBee network provided by the ZigBee gateway.

SUMMARY

One embodiment is directed to a method for joining a smart energy device to a ZigBee network. The method includes sending, from a ZigBee gateway to a database server, a first extended unique identifier (EUI) for the ZigBee gateway. If one or more first EUIs, corresponding to one or more smart energy devices bundled with the ZigBee gateway, are received at the ZigBee gateway from the database server, then the method includes receiving a request from a first smart energy device to join the ZigBee gateway, the request including a second EUI corresponding to the first smart energy device. The second EUI from the first smart energy device is compared with the first one or more EUIs received from the database server. If the second EUI from the first smart energy device matches any of the first one or more EUIs, an install code or link key corresponding to the matched one of the first one or more EUIs is sent to the first smart energy device. Otherwise, if one or more EUIs are not received at the ZigBee gateway from the database server, then the method includes prompting a user for an install code. The install code can be received from the user and sent to any smart energy device sending a join request to the ZigBee gateway. If a response is received from the first smart energy device that confirms that the first smart energy device would like to join, the first smart energy device is joined to a ZigBee network provided by the ZigBee gateway.

DETAILED DESCRIPTION

The process described above for joining a smart energy device to a ZigBee network can be problematic for a user since the process requires input of certain information and a particular order in which steps should be done in order to achieve a good user experience. For example, if the smart energy device is powered-up prior to the identification information being input into the application, the user will have to wait an indeterminate amount of time before the smart energy device will send out an association request to join the ZigBee network. The indeterminate amount of time is due to the ZigBee protocol. According to the ZigBee protocol, the smart energy device is to send out such an association request immediately upon powering-up and then at defined intervals thereafter. If the ZigBee gateway is not configured to join the smart energy device when the smart energy device sends the association request immediately upon powering up, this initial association request will be denied by the ZigBee gateway. Then, when the ZigBee gateway is configured to allow joining of the smart energy device, the ZigBee gateway will have to wait until the next association request sent by the smart energy device before joining the smart energy device to the the ZigBee gateway. This time period of time can be up to 10 minutes, depending on when within a given association request interval that the ZigBee gateway is configured to allow joining of the smart energy device. As such, the user may be left wondering why the process is not working during this time.

The subject matter described herein addresses these concerns by providing a more user-friendly process for joining a smart energy device to a ZigBee gateway. The process enables potential zero-entry by a user by bundling one or more smart energy devices with a ZigBee gateway prior to sale and by linking identifying information for the one or more smart energy devices with the ZigBee gateway in a database on a remote server. The ZigBee gateway can then communicate with the server over the Internet to obtain the identifying information for the one or more smart energy devices, and use the identifying information to join the one or more smart energy devices without requiring input from a user. In instances that the user does have to input information, the information corresponding to the smart energy device is limited to an install code, which is configured such that errors in inputting the install code can be identified at the time the install code is input by the user. This can reduce delay due in joining the smart energy device to incorrect input of the information by the user.

Figure 1:
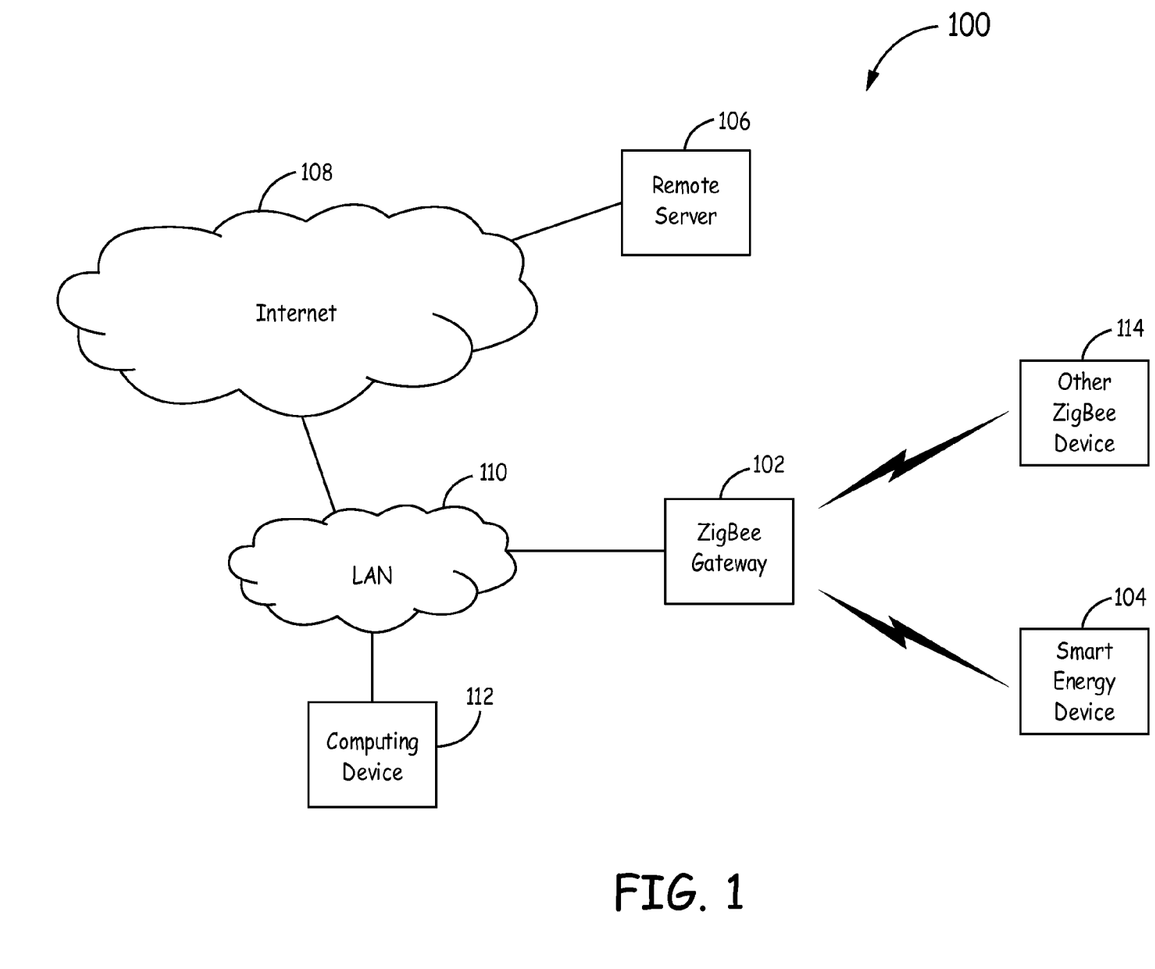
FIG. 1 is a block diagram of an example system including a ZigBee gateway and one or more smart energy devices.

FIG. 1 is a block diagram of an example system 100 including a ZigBee gateway 102 and one or more smart energy devices 104. The ZigBee gateway 102 and the one or more smart energy devices 104 are configured to wirelessly communicate with each other using a ZigBee protocol. The ZigBee gateway 102 is communicatively coupled to a remote server 106 through the Internet 108. In an example, the ZigBee gateway 102 is coupled to a local area network (LAN) 110 which is communicatively coupled to the Internet 108. In such an example, a computing device 112 can be coupled to the LAN 110 and is configured to communicate with the ZigBee gateway 102 over the LAN 110. Although the computing device 112 is shown as having a wired connection to the LAN 110 a wireless connection may also be used. One or more other ZigBee devices 114 may also be within wireless range of the ZigBee gateway 102.

The ZigBee gateway 102 is configured to interface communications between the smart energy devices 104 wirelessly coupled to the ZigBee gateway 102 using the ZigBee protocol and devices on the Internet 108 and/or LAN 110 coupled to the ZigBee gateway 100. As such, the ZigBee gateway 102 provides a gateway for the smart energy devices 104 to the Internet 108 and/or devices coupled to the LAN 110.

The smart energy device 104 can include any smart energy device configured to communicate information (e.g., telemetry) using the ZigBee protocol. For example, the smart energy device 104 can be a smart energy bridge, thermostat, or can be a device within a larger appliance such as smart energy electronics within an air conditioner or fridge. As such, the smart energy device 104 can include appropriate processing unit(s), memory, storage media, instructions, and wireless transceiver for wireless communication with the ZigBee gateway 102 using the ZigBee protocol.

One or more other ZigBee devices 114 may also be within range of the ZigBee network provided by the ZigBee gateway 102. Such device(s) 114 are capable of communicating using the ZigBee protocol. The methods and systems herein, however, are configured to enable the smart energy device 104 to join the ZigBee network provided by the ZigBee gateway 102, without joining other ZigBee device(s) 114 not intended to be connected to the ZigBee gateway 102. Moreover, the methods and systems described herein, enable such functionality in a user-friendly manner.

The computing device 112 can include an application installed thereon that is configured to communicate with the ZigBee gateway 102 over the LAN 110. The computing device 112 can include any appropriate computing device such as a desktop, laptop, tablet, smart phone, or personal digital assistant (PDA).

Figure 2:
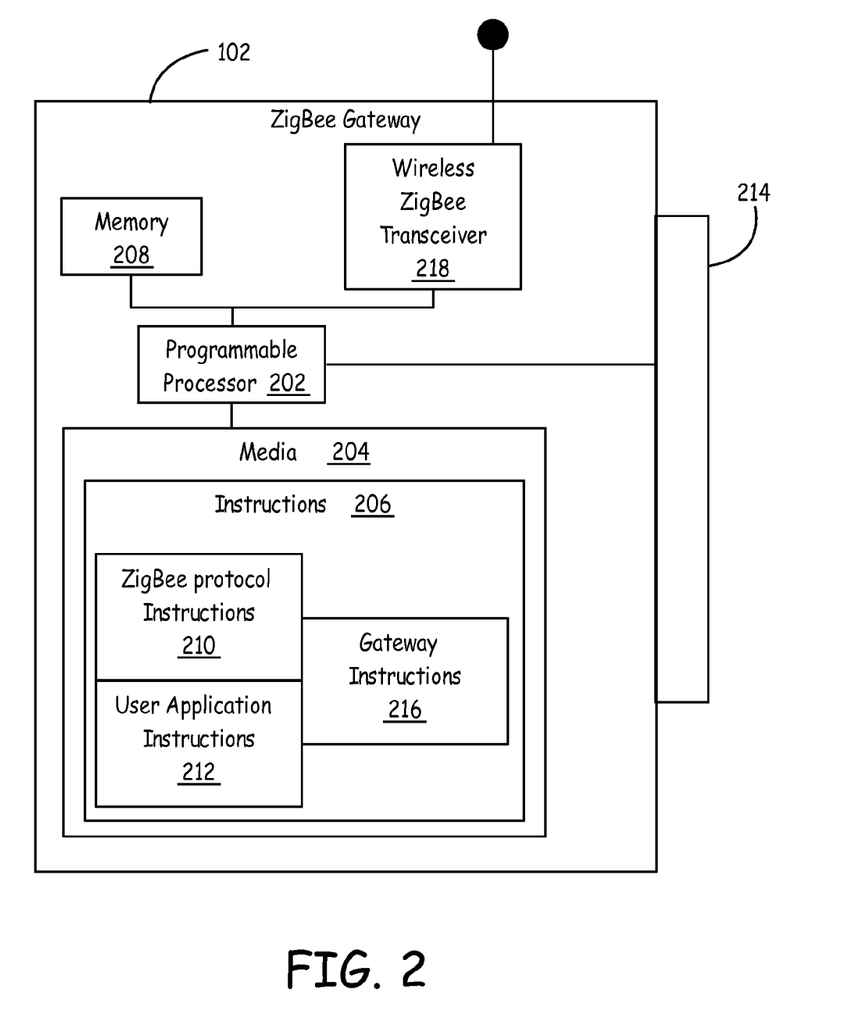
FIG. 2 is a block diagram of an example ZigBee gateway of the system of FIG. 1.

FIG. 2 is a block diagram of an example ZigBee gateway 102 configured to implement such a process. The ZigBee gateway 102 is an electronic device that includes one or more processing units 202 coupled to one or storage media 204. The one or more processing units 202 can include a general purpose processor (e.g., a CPU) or a special purpose processor. The one or more storage media 204 can include instructions 206 stored (or otherwise embodied) thereon. The instructions 206 are readable by the one or more processing units 202 for execution thereby. The ZigBee gateway 102 also includes memory 208 that is coupled to the one or more processing units 202 for storing instructions (and related data) during execution by the one or more processing units 202. Memory 208 comprises, in one implementation, any suitable form of random access memory (RAM) now known or later developed, such as dynamic random access memory (DRAM). In other implementations, other types of memory are used. The instructions 206 include ZigBee protocol instructions 210 that are configured to implement the ZigBee protocol for wireless communication with smart energy devices. The instructions 206 also include user application instructions 212 that are configured to implement communication with a user application operating on a computing device in the local area network with which the ZigBee gateway 102 is a member.

The ZigBee gateway 102 can also include one or more ports 214 (e.g., RJ-45 jacks) to connect to a physical communication media, such as a CAT-5 or CAT-6 cable. The instructions 206 also include gateway instructions 216 configured to interface communications between a smart energy device 104 wirelessly coupled to the ZigBee gateway 102 using the ZigBee protocol and the LAN 110 which is also coupled to the ZigBee gateway 102. The smart energy device 104 can utilize the ZigBee gateway 102 to send and receive data over the LAN 110 and/or over the Internet 108 if the LAN 110 is coupled to the Internet 108. The ZigBee gateway 102 also includes a wireless ZigBee transceiver 218 coupled to an antenna for sending and receiving wireless signals according to the ZigBee protocol (e.g., with the smart energy device 104).

Figure 3A:
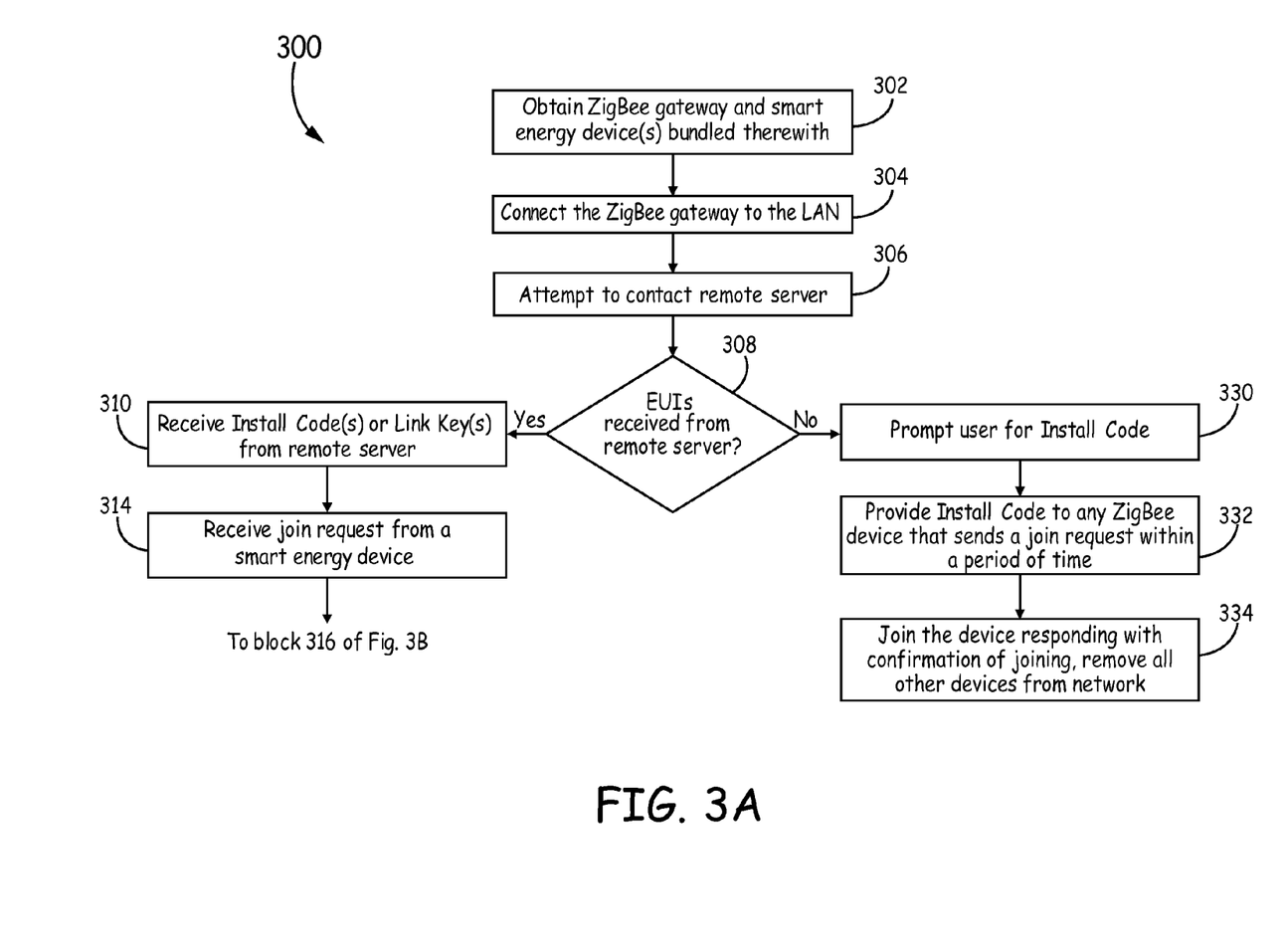
FIGS. 3A and 3B are flow diagrams of an example process for joining one or more smart energy devices to the ZigBee gateway of FIG. 2.
Figure 3B:
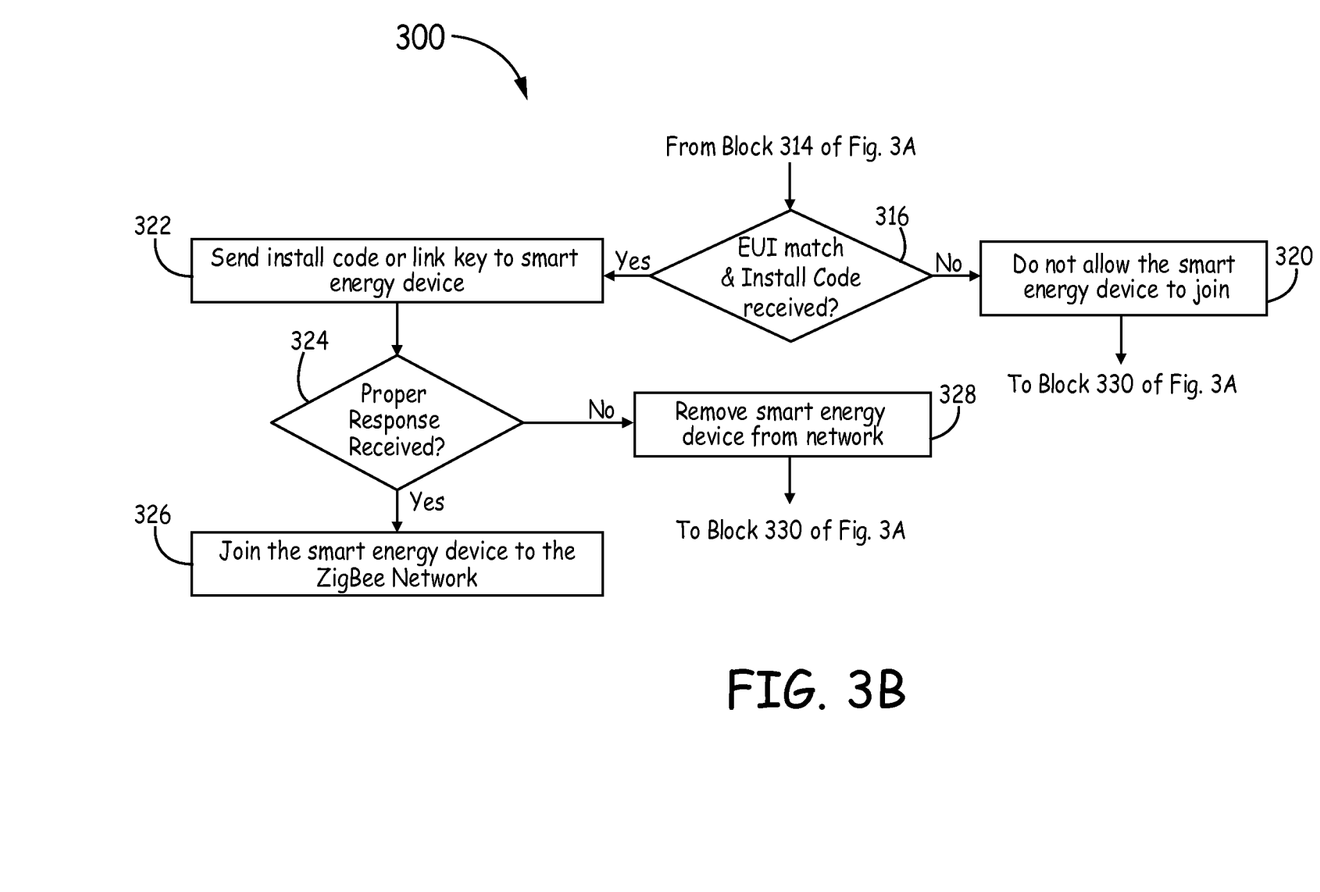

FIGS. 3A and 3B are flow diagrams illustrating an example of a process 300 for user-friendly joining of a smart energy device with a ZigBee network implemented by the ZigBee gateway 102. Process 300 begins with the user obtaining a ZigBee gateway 102 and one or more smart energy devices 104 bundled with the ZigBee gateway 102 (block 302). The following discussion will refer to a single smart energy device 104, but it should be understood that the process 300 can be used to join more than one smart energy device 104 to the ZigBee gateway 102. In an example, the ZigBee gateway 102 and the bundled smart energy device 104 are obtained from a utility provider for the user, such as an electric, gas, or water provider for the user. In another example, the ZigBee gateway 102 and the bundled smart energy device 104 are provided by a consumer products retailer. In many examples, the ZigBee gateway 102 and the bundled smart energy device 104 are obtained from the same entity and at the same time. In this way, the entity can bundle the two together. In some examples, however, the user may have previously purchased the smart energy device 104 and/or the ZigBee gateway 102 and the entity from which the ZigBee gateway 102 is obtained can bundle the two together. This can be done by the entity obtaining information from the user regarding the previously purchased smart energy device 104 and/or ZigBee gateway 102.

In any case, the entity which provides the ZigBee gateway 102 can bundle the ZigBee gateway 102 with the smart energy device 104 by recording identification information for each and storing such identification information in the remote server 106 in a manner such that the identification information for the ZigBee gateway 102 is linked to (associated with) the identification information for the smart energy device 104. In an example, the identification information including an extended unique identifier (EUI) for the ZigBee gateway 102 and the smart energy device 104. The identification information can also include an install code or link key which is unique to the smart energy device 104. The install code or link key can be assigned by the entity providing the ZigBee gateway 102 or the entity providing the smart energy device 104, and can be used by the smart energy device 104 to verify that the ZigBee gateway 102 is the correct device to join with. As used herein, a link key is an encryption key that can be used for encrypting communications to and from the smart energy device 104, and the install code is a hash of the link key, such that the link key can be generated from the install code and vice-versa. Moreover, the install code is configured to have an integrity check embedded within the code, such that an application (e.g., an application on computing device 112) can verify whether a proper install code was input by a user. Such an integrity check can be embedded within the install code in any suitable fashion, such as, for example, embedding a cyclic redundancy check (CRC) code within the install code. The remote server 106 is also referred to herein as the "database server" since the remote server 106 stores a database including identification information for a plurality of associations between ZigBee gateways 102 and bundled smart energy devices 104.

Once the ZigBee gateway 102 and the smart energy device 104 are obtained, the ZigBee gateway 102 can be connected to a network device in a location that is within communication range of the location in which the smart energy device 104 is installed to to-be installed (block 304). To be within communication range, the smart energy device 104 is within communication range of a ZigBee device coupled to the ZigBee network to-be-provided by the ZigBee gateway 102. In an example, the network device is a LAN router or switch implementing the LAN 110. In another example, the network device is a modem communicatively coupled to the Internet 108 via an Internet service provider. In any case, the ZigBee gateway 102 can be connected to the network device using a physical communication medium such as a CAT-5 or CAT-6 cable. Before or after the ZigBee gateway 102 is coupled to the network, the ZigBee gateway 102 can be powered-up.

Upon being both powered up and in communication with the network device, the ZigBee gateway 102 can attempt to contact the remote server 106 (block 306). In examples where the network device is communicatively coupled to the Internet 108, the ZigBee gateway 102 should be able to contact the remote server 106. If the network device is not communicatively coupled to the Internet 108, however, the ZigBee gateway 102 may be unable to contact the remote server 106.

In attempting to contact the remote server 106, the ZigBee gateway 102 can attempt obtain one or more EUIs corresponding to one or more bundled smart energy devices 104. If the one or more EUIs for the one or more smart energy devices 104 are received at the ZigBee gateway 102 (block 308), the ZigBee gateway 102 can proceed with a zero-entry process. If one or more EUIs are not received by the ZigBee gateway 102, the ZigBee gateway 102 attempts to obtain information regarding the smart energy device 104 from the user (block 330) described below. There are several reasons why one or more EUIs would not be received by the ZigBee gateway 102. First, if the network device to which the ZigBee gateway 102 is connected (and more particularly, the ZigBee gateway 102 itself) does not have access to the Internet 108, the ZigBee gateway 102 may not be able to communicate with (contact) the remote server 106, and therefore cannot receive the EUIs therefrom. Second, even if the ZigBee gateway 102 can communicate with the remote server 106, one or more smart energy devices 104 may not have been bundled with the ZigBee gateway 102. That is, identification information and an association therebetween may not have been stored in the remote server 106 for various reasons. Other reasons may also exist as to why EUIs may not be received by the ZigBee gateway 102 from the remote server 106.

If the ZigBee gateway 102 can contact the remote server 106, the ZigBee gateway sends its EUI over the Internet 108 to the remote server 106. In response to receiving the EUI of the ZigBee gateway 102, the remote server 106 can provide one or more EUIs to the ZigBee gateway 102. The one or more EUIs can each correspond to a smart energy device 104 that is bundled with the ZigBee gateway 102. That is, upon receiving an EUI from a ZigBee gateway 102 corresponding to the ZigBee gateway 102, the remote server 106 can send to the ZigBee gateway 102 any EUIs for smart energy devices that are associated with the EUI of the ZigBee gateway 102 in the database on the remote server 106. These EUIs can be received by the ZigBee gateway 102. In some examples, the remote server 106 can also send an install code or a link key for one or more of the EUI(s) received at the ZigBee gateway 102. In one example, an install code or a link key for each of the one or more EUIs can be sent. These install code(s) or link key(s) can be received by the ZigBee gateway 102 along with an indication of which EUI each install code or link key is associated with (block 310).

After connecting and powering-up the ZigBee gateway 102, the user can be instructed to power-up or power cycle the bundled smart energy device 104. Ideally, the ZigBee gateway 102 has already contacted the remote server and obtained the EUIs for any bundled smart energy devices, prior to the user powering-up the bundled smart energy device. Upon powering-up the smart energy device 104, the smart energy device 104 will send a join request to any ZigBee coordinators of any ZigBee networks within range according to the ZigBee protocol. The ZigBee gateway 102 is configured to implement a ZigBee network as a ZigBee coordinator. Thus, as long as the smart energy device 104 is within range of the ZigBee gateway 102, the smart energy device 104 will send a join request to the ZigBee gateway 102, which will be received by the ZigBee gateway 102 (block 314). As part of the join request, the smart energy device 104 will send its EUI which will also be received by the ZigBee gateway 102. The ZigBee gateway 102 can then compare the EUI from smart energy device 104 with the one or more EUIs received from the remote server 106 (block 316).

If the EUI from the smart energy device 104 does not match any of EUIs from the remote server 106, or if an install code or link key corresponding to a matched EUI was not received from the remote server 106, the ZigBee gateway 102 does not allow the smart energy device 104 to join the ZigBee network at this time (block 320). In such circumstances, the ZigBee gateway 102 attempts to obtain an install code from a user for the smart energy device (block 330) as described below.

If the EUI matches and the smart energy device 104 and if an install code or a link key was received that is associated with the EUI for the smart energy device 104, the ZigBee gateway 102 sends the install code or link key to the smart energy device 104 (block 322). As mentioned above, any or all of the EUIs stored at the remote server 106 can have an install code or link key stored at the remote server 106 and associated with a respective EUI. In examples where the ZigBee gateway 102 is able to communicate with the remote server 106, the remote server 106 can send, to the ZigBee gateway, any install codes or link keys associated with EUIs for bundled smart energy devices 104. In an example, the ZigBee gateway 102 is configured to send such install codes or link keys to a smart energy device 104 only for a limited period of time starting from when the one or more EUIs are received from the remote server 106. In one implementation, this period of time is approximately 1 hour.

Prior to sending the install code or link key to the smart energy device 104, the install code or link key can be displayed to a user for verification of its accuracy. Display of the install code or link key can occur via an application that is installed on the computing device 112. Such an application can be provided with the ZigBee gateway 102 and/or smart energy device 104 or can be downloaded from the Internet 108. The application can identify the ZigBee gateway 102 as a device coupled to the LAN 110 to which the computing device 112 is also coupled and the application can establish communication with the ZigBee gateway 102.

The application can prompt a user to establish a user account and input information to do so. To display the install code or the link key to a user, the ZigBee gateway 102 can send the install code or the link key to the application on the computing device 112. The application can then display the install code or the link key on a display of the computing device 112. The application can also prompt a user for verification that the install code or link key displayed is the install code or link key of the smart energy device 104 that the user desires to couple to the ZigBee gateway 102.

If the user confirms that the install code or link key is correct (i.e., is associated with the smart energy device 104 to be joined), the ZigBee gateway 102 can send the install code or link key to the smart energy device 104 (block 322). If the user indicates that the install code or link key is not correct (is not associated with the smart energy device 104 to be joined), the application can prompt a user to input an install code (block 330) as described below.

If the install code or link key is verified as correct by the user, the ZigBee gateway 102 can send the install code or link key to the smart energy device 104. The smart energy device 104 can used to install code or link key to determine whether the ZigBee gateway 102 is the device to which the smart energy device 104 is configured to connect. That is, the smart energy device 104 can be configured to connect to a ZigBee network if the coordinator thereof (e.g., the ZigBee gateway 102) sends the install code or link key corresponding to the smart energy device 104 to the smart energy device 104. If the smart energy device 104 receives the correct install code or link key from the ZigBee gateway 102, the smart energy device 104 can send a response to the ZigBee gateway 102 confirming that the smart energy device 104 desires to join the ZigBee network provided by the ZigBee gateway 102. Once such a response is received at the ZigBee gateway 102 from the smart energy device 104, the ZigBee gateway 102 joins the smart energy device 104 to the ZigBee network (block 326). If the smart energy device 104 (or device 114) is not configured to join the ZigBee network provided by the ZigBee gateway 102, the smart energy device 104 will not provide a response to the install code confirming that the smart energy device 104 desires to join the ZigBee network, and the ZigBee gateway 102 will then remove the smart energy device 104 from the ZigBee network (block 328). The ZigBee gateway 102 will then attempt to manually obtain the install information by prompting a user for an install code (block 330) as discussed below.

If the smart energy device 104 is joined to the ZigBee network, the smart energy device 104 is able to send and receive data to one or more other devices that are coupled to the LAN 110 or the Internet 108. Such communication can use the link key or a related key (e.g., in a public-private key pair) to encrypt data for the communication.

Referring back to block 308 of process 300, if no EUIs are received form the remote server 106, or in other instances in which the join process has failed as described above, the ZigBee gateway 102 can prompt a user to input an install code for the smart energy device 104 (block 330). In particular, the ZigBee gateway 102 can send a message to the application on the computing device 112 requesting that the application request an install code corresponding to the smart energy device 104 to be joined from the user. The user can then input an install code via the application on the computing device 112. The application can verify that the install code is a proper install code by checking the integrity check (e.g., CRC code) embedded in the install code. If the install code is proper, the application sends the install code to the ZigBee gateway 102. If the install code is not proper, the application can request that the user check the install code and/or re-enter the install code.

Once the ZigBee gateway 102 receives the install code, the ZigBee gateway 102 is configured to send the install code to any ZigBee device (e.g., 114, 104) that sends a join request to the ZigBee gateway 102 (block 332). In an example, the ZigBee gateway 102 is configured to only send the install code to a ZigBee device that sends a join request to the ZigBee gateway 102 within a period of time, such as 1 hour, after receiving the install code from the application. After receiving a proper install code that was input into the application, the application can instruct the user to power cycle or turn on the smart energy device 104, such that the smart energy device 104 attempts to join the ZigBee network upon starting up. This can reduce the wait time before the smart energy device 104 sends a join request to the ZigBee gateway 102.

Device(s) that are configured to connect with the ZigBee gateway 102 (e.g., the smart energy device 104) will respond to the install code with a response confirming their desire to join the ZigBee network provided by the ZigBee gateway 102. Devices that are not configured to connect with the ZigBee gateway 102 will not respond indicating their desire to join. For example, such devices may ignore the install code. Because of this, even though the install code may be sent to many devices, the Zigbee gateway 102 can identify the one or more ZigBee devices with which connection is desired from other devices with which connection is not desired, because only the one or more ZigBee devices that are configured to connect with the ZigBee gateway 102 will respond to the install code indicating that they desire to connect to the ZigBee gateway 102.

Upon receiving the response from the smart energy device 104, the ZigBee gateway 102 joins the smart energy device 104 to the ZigBee network removes any other ZigBee devices 114 from which join requests were received, but join failed, from the ZigBee network.

In this way, an efficient and user friendly system and method can be used to join a smart energy device 104 with a ZigBee gateway 102.

Example Embodiments

Example 1 includes a method for joining a smart energy device to a ZigBee network, the method comprising: sending, from a ZigBee gateway to a database server, a first extended unique identifier (EUI) for the ZigBee gateway; if one or more first Ens, corresponding to one or more smart energy devices bundled with the ZigBee gateway, are received at the ZigBee gateway from the database server, then: receiving a request from a first smart energy device to join the ZigBee gateway, the request including a second EUI corresponding to the first smart energy device; comparing the second EUI from the first smart energy device with the first one or more EUIs received from the database server; and if the second EUI from the first smart energy device matches any of the first one or more EUIs, sending an install code or link key corresponding to the matched one of the first one or more EUIs to the first smart energy device, else: if one or more EUIs are not received at the ZigBee gateway from the database server, then: prompting a user for an install code; receiving the install code from the user; sending the install code to any smart energy device sending a join request to the ZigBee gateway; if a response is received from the first smart energy device that confirms that the first smart energy device would like to join, joining the first smart energy device to a ZigBee network provided by the ZigBee gateway.

Example 2 includes the method of Example 1, wherein if the one or more EUIs are received at the ZigBee gateway from the database server, then: sending the install code or link key for a limited period of time, wherein the limited period of time begins based on when the first one or more EUIs are received at the ZigBee gateway.

Example 3 includes the method of Example 2, wherein the limited period of time is approximately 1 hour.

Example 4 includes the method of any of Examples 1-3, wherein if the one or more EUIs are received at the ZigBee gateway from the database server, then: receiving, at the ZigBee gateway from the database server, one of a link key or an install code for each of the first one or more Ms; wherein sending an install code or link key to the first smart energy device includes sending an install code or link key received from database server and corresponding to the second EUI of the first smart energy device; if a response is received from the first smart energy device that confirms that the first smart, joining the first smart energy device to the ZigBee network provided by the ZigBee gateway.

Example 5 includes the method of Example 4, comprising: if the smart energy device is joined, sending energy data from the smart energy device using the link key to encrypt the energy data.

Example 6 includes the method of any of Examples 4 or 5, wherein if the one or more EUIs are received at the ZigBee gateway, then: displaying for a user an install code corresponding to the second EUI received from the database server; and receiving a confirmation from a user that the install code corresponds to a smart energy device to be installed before sending the install code to the first smart energy device.

Example 7 includes the method of Example 6, comprising: establishing communication between the ZigBee gateway and an application running on a computing device in the local area network to which the ZigBee gateway is connected; wherein displaying an install code includes displaying an install code on a display of the computing device using the application; and wherein receiving a confirmation includes receiving an input from the user via a user interface of the application and sending data corresponding to the input from the application to the ZigBee gateway.

Example 8 includes the method of any of Examples 1-7, wherein sending the install code to any smart energy device sending a join request to the ZigBee gateway includes sending the install code for limited period of time after receiving the install code from the user.

Example 9 includes the method of Example 8, wherein the limited period of time is approximately 1 hour.

Example 10 includes the method of any of Examples 1-9, wherein if one or more EUIs are not received at the ZigBee gateway from the database server, and if no response is received from the first smart energy device that confirms the first smart energy device would like to join, removing the first smart energy device from the ZigBee gateway.

Example 11 includes a ZigBee gateway comprising: one or more processing units; one or more storage medias coupled to the one or more processing units, the one or more storage medias including instructions which, when executed by the one or more processing units, are configured to cause the one or more processing units to: send, from a ZigBee gateway to a database server, a first extended unique identifier (EUI) for the ZigBee gateway; if one or more first EUIs, corresponding to one or more smart energy devices bundled with the ZigBee gateway, are received at the ZigBee gateway from the database server, then: receive a request from a first smart energy device to join the ZigBee gateway, the request including a second EUI corresponding to the first smart energy device; compare the second EUI from the first smart energy device with the first one or more EUIs received from the database server; and if the second EUI from the first smart energy device matches any of the first one or more EUIs, send an install code or link key to the first smart energy device, else: if one or more EUIs are not received at the ZigBee gateway from the database server, then: prompt a user for an install code; receive the install code from the user; send the install code to any smart energy device sending a join request to the ZigBee gateway; if a response is received from the first smart energy device that confirms that the first smart energy device would like to join, join the first smart energy device to a ZigBee network provided by the ZigBee gateway.

Example 12 includes the ZigBee gateway of Example 11, wherein if the one or more EUIs are received at the ZigBee gateway from the database server, then the instruction are configured to cause the one or more processing units to: send the install code or link key for a limited period of time, wherein the limited period of time begins based on when the first one or more EUIs are received at the ZigBee gateway.

Example 13 includes the ZigBee gateway of Example 12, wherein the limited period of time is approximately 1 hour.

Example 14 includes the ZigBee gateway of any of Examples 11-13, wherein if the one or more EUIs are received at the ZigBee gateway from the database server, then the instructions are configured to cause the one or more processing units to: receive, at the ZigBee gateway from the database server, one of a link key or an install code for each of the first one or more Ms; wherein send an install code or link key to the first smart energy device includes send an install code or link key received from database server and corresponding to the second EUI of the first smart energy device; if a response is received from the first smart energy device that confirms that the first smart, join the first smart energy device to the ZigBee network provided by the ZigBee gateway.

Example 15 includes the ZigBee gateway of Example 14, wherein the instructions are configured to cause the one or more processing units to: if the smart energy device is joined, relay energy data from the first smart energy device to the Internet.

Example 16 includes the ZigBee gateway of any of Examples 14 or 15, wherein if the one or more EUIs are received at the ZigBee gateway, then the instructions are configured to cause the one or more processing units to: cause an install code to be displayed to a user, the install code corresponding to the second EUI received from the database server; and receive a confirmation that the install code corresponds to a smart energy device to be installed before sending the install code to the first smart energy device.

Example 17 includes the ZigBee gateway of Example 16, wherein instructions are configured to cause the one or more processing units to: establish communication between the ZigBee gateway and an application running on a computing device in the local area network to which the ZigBee gateway is connected; wherein display an install code includes display an install code on a display of the computing device using the application; and wherein receive a confirmation includes receive a confirmation based on an input from the user via a user interface of the application.

Example 18 includes the ZigBee gateway of any of Examples 11-18, wherein send the install code to any smart energy device sending a join request to the ZigBee gateway includes send the install code for limited period of time after receiving the install code from the user.

Example 19 includes the ZigBee gateway of any of Examples 11-18, wherein if one or more EUIs are not received at the ZigBee gateway from the database server, and if no response is received from the first smart energy device that confirms the third smart energy device would like to join, the instructions are configured to cause the one or more processing units to, remove the first smart energy device from the ZigBee gateway.

Example 20 includes a method for joining a smart energy device to a ZigBee network, the method comprising: sending, from a ZigBee gateway to a database server, a first extended unique identifier (EUI) for the ZigBee gateway; if one or more first EUIs, corresponding to one or more smart energy devices bundled with the ZigBee gateway, are received at the ZigBee gateway from the database server, then: receiving a request from a first smart energy device to join the ZigBee gateway, the request including a second EUI corresponding to the first smart energy device; if the second EUI from the first smart energy device matches any of the one or more EUIs and if one of a link key or an install code for the second EUI was received, at the ZigBee gateway from the database server, sending the install code or link key to the first smart energy device; if a response is received from the second smart energy device that confirms that the first smart energy device would like to join a ZigBee network provided by the ZigBee gateway, joining the first smart energy device to the ZigBee network, else: if one or more EUIs are not received at the ZigBee gateway from the database server, or if a link key or install code corresponding to a matching EUI is not received at the ZigBee gateway, then: prompting a user for an install code for a bundled smart energy device; receiving the one of an install code from the user; verifying that the install code is a proper install code; sending the install code to any device that sends a join request to the ZigBee gateway; if a response is received from the first smart energy device that confirms that the first smart energy device would like to join the ZigBee network, joining the first smart energy device to the ZigBee network; and removing, from the ZigBee gateway, any devices that sent join requests but did not confirm joining in response to the install code.

What is claimed is:

1. A method for joining a smart energy device to a ZigBee network, the method comprising:
   sending, from a ZigBee gateway to a database server, a first extended unique identifier (EUI) for the ZigBee gateway without any user input;
   if one or more first EUIs, corresponding to one or more smart energy devices bundled with the ZigBee gateway, are received at the ZigBee gateway from the database server, then:
      receiving a request from a first smart energy device to join the ZigBee gateway, the request including a second EUI corresponding to the first smart energy device;
      comparing the second EUI from the first smart energy device with the first one or more EUIs received from the database server;
      if the second EUI from the first smart energy device matches any of the first one or more EUIs, sending an install code or link key corresponding to the matched one of the first one or more EUIs to the first smart energy device; and
      if a response is received from the first smart energy device that confirms that the first smart energy device would like to join, joining the first smart energy device to a ZigBee network provided by the ZigBee gateway without any user input; else:
   if one or more EUIs are not received at the ZigBee gateway from the database server, then:
      prompting a user for an install code;
      receiving the install code from the user;
      sending the install code from the user to any smart energy device sending a join request to the ZigBee gateway; and
      if a response is received from the first smart energy device that confirms that the first smart energy device would like to join, joining the first smart energy device to a ZigBee network provided by the ZigBee gateway.

2. The method of claim 1, wherein if the first one or more EUIs are received at the ZigBee gateway from the database server, then:
   sending the install code or link key for a limited period of time, wherein the limited period of time begins based on when the first one or more EUIs are received at the ZigBee gateway.

3. The method of claim 2, wherein the limited period of time is approximately 1 hour.

4. The method of claim 1, wherein if the first one or more EUIs are received at the ZigBee gateway from the database server, then:
   receiving, at the ZigBee gateway from the database server, one of a link key or an install code for each of the first one or more EUIs;
   wherein sending an install code or link key to the first smart energy device includes sending an install code or link key received from the database server and corresponding to the second EUI of the first smart energy device.

5. The method of claim 4, comprising:
   if the smart energy device is joined, sending energy data from the smart energy device using the link key to encrypt the energy data.

6. The method of claim 4, wherein if the one or more EUIs are received at the ZigBee gateway, then:
   displaying for a user an install code corresponding to the second EUI received from the database server; and
   receiving a confirmation from a user that the install code corresponds to a smart energy device to be installed before sending the install code to the first smart energy device.

7. The method of claim 6, comprising:
   establishing communication between the ZigBee gateway and an application running on a computing device in the local area network to which the ZigBee gateway is connected;
   wherein displaying an install code includes displaying an install code on a display of the computing device using the application; and
   wherein receiving a confirmation includes receiving an input from the user via a user interface of the application and sending data corresponding to the input from the application to the ZigBee gateway.

8. The method of claim 1, wherein sending the install code to any smart energy device sending a join request to the ZigBee gateway includes sending the install code for a limited period of time after receiving the install code from the user.

9. The method of claim 8, wherein the limited period of time is approximately 1 hour.

10. The method of claim 1, wherein if one or more EUIs are not received at the ZigBee gateway from the database server, and if no response is received from the first smart energy device that confirms the first smart energy device would like to join, removing the first smart energy device from the ZigBee gateway.

11. A ZigBee gateway comprising:
one or more processing units; and
one or more non-transitory storage medias coupled to the one or more processing units, the one or more non-transitory storage medias including instructions which, when executed by the one or more processing units, are configured to cause the one or more processing units to:
send, from a ZigBee gateway to a database server, a first extended unique identifier (EUI) for the ZigBee gateway without any user input;
if one or more first EUIs, corresponding to one or more smart energy devices bundled with the ZigBee gateway, are received at the ZigBee gateway from the database server, then:
receive a request from a first smart energy device to join the ZigBee gateway, the request including a second EUI corresponding to the first smart energy device;
compare the second EUI from the first smart energy device with the first one or more EUIs received from the database server;
if the second EUI from the first smart energy device matches any of the first one or more EUIs, send an install code or link key to the first smart energy device; and
if a response is received from the first smart energy device that confirms that the first smart energy device would like to join, join the first smart energy device to a ZigBee network provided by the ZigBee gateway without any user input; else:
if one or more EUIs are not received at the ZigBee gateway from the database server, then:
prompt a user for an install code;
receive the install code from the user;
send the install code from the user to any smart energy device sending a join request to the ZigBee gateway; and
if a response is received from the first smart energy device that confirms that the first smart energy device would like to join, join the first smart energy device to a ZigBee network provided by the ZigBee gateway.

12. The ZigBee gateway of claim 11, wherein if the first one or more EUIs are received at the ZigBee gateway from the database server, then the instructions are configured to cause the one or more processing units to:
send the install code or link key for a limited period of time, wherein the limited period of time begins based on when the first one or more EUIs are received at the ZigBee gateway.

13. The ZigBee gateway of claim 12, wherein the limited period of time is approximately 1 hour.

14. The ZigBee gateway of claim 11, wherein if the first one or more EUIs are received at the ZigBee gateway from the database server, then the instructions are configured to cause the one or more processing units to:

receive, at the ZigBee gateway from the database server, one of a link key or an install code for each of the first one or more EUIs;
wherein send an install code or link key to the first smart energy device includes send an install code or link key received from the database server and corresponding to the second EUI of the first smart energy device.

15. The ZigBee gateway of claim 14, wherein the instructions are configured to cause the one or more processing units to:
if the smart energy device is joined, relay energy data from the first smart energy device to the Internet.

16. The ZigBee gateway of claim 14, wherein if the one or more EUIs are received at the ZigBee gateway, then the instructions are configured to cause the one or more processing units to:
cause an install code to be displayed to a user, the install code corresponding to the second EUI received from the database server; and
receive a confirmation that the install code corresponds to a smart energy device to be installed before sending the install code to the first smart energy device.

17. The ZigBee gateway of claim 16, wherein the instructions are configured to cause the one or more processing units to:
establish communication between the ZigBee gateway and an application running on a computing device in a local area network to which the ZigBee gateway is connected;
wherein display an install code includes display an install code on a display of the computing device using the application; and
wherein receive a confirmation includes receive a confirmation based on an input from the user via a user interface of the application.

18. The ZigBee gateway of claim 11, wherein send the install code to any smart energy device sending a join request to the ZigBee gateway includes send the install code for a limited period of time after receiving the install code from the user.

19. The ZigBee gateway of claim 11, wherein if one or more EUIs are not received at the ZigBee gateway from the database server, and if no response is received from the first smart energy device that confirms the first smart energy device would like to join, the instructions are configured to cause the one or more processing units to, remove the first smart energy device from the ZigBee gateway.

20. A method for joining a smart energy device to a ZigBee network, the method comprising:
sending, from a ZigBee gateway to a database server, a first extended unique identifier (EUI) for the ZigBee gateway without any user input;
if one or more first EUIs, corresponding to one or more smart energy devices bundled with the ZigBee gateway, are received at the ZigBee gateway from the database server, then:
receiving a request from a first smart energy device to join the ZigBee gateway, the request including a second EUI corresponding to the first smart energy device;
if the second EUI from the first smart energy device matches any of the first one or more EUIs and if one of a link key or an install code for the second EUI was received, at the ZigBee gateway from the database server, sending the install code or link key to the first smart energy device; and if a response is received from the first smart energy device that confirms that the first smart energy device would like to join a ZigBee network provided by the ZigBee gateway, joining the first smart energy device to the ZigBee network without any user input;
else:
if one or more EUIs are not received at the ZigBee gateway from the database server, or if a link key or install code corresponding to a matching EUI is not received at the ZigBee gateway, then:
prompting a user for an install code for a bundled smart energy device;
receiving the install code from the user;
verifying that the install code from the user is a proper install code;
sending the verified install code to any device that sends a join request to the ZigBee gateway;
if a response is received from the first smart energy device that confirms that the first smart energy device would like to join the ZigBee network, joining the first smart energy device to the ZigBee network; and
removing, from the ZigBee gateway, any devices that sent join requests but did not confirm joining in response to the verified install code.

* * * * *